3,224,989
VICINAL ACRYLOXY HYDROXY LONG CHAIN FATTY COMPOUNDS AND POLYMERS THEREOF

Charles S. Nevin, Decatur, Ill., assignor to A. E. Staley Manufacturing Company, Decatur, Ill., a corporation of Delaware
No Drawing. Filed June 26, 1961, Ser. No. 119,339
11 Claims. (Cl. 260—23)

This application is a continuation-in-part of copending application Serial No. 800,071, filed March 8, 1959, now abandoned.

The present invention relates broadly to vinylacyloxy-hydroxy long chain aliphatic compounds. They are characterized by two structural features: (1) at least one long aliphatic chain having from 10 to 24 carbon atoms, and (2) at least one hydroxy alkyl ester grouping represented by the following formula:

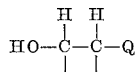

In the above formula, Q is a monovinylated acryloxy radical, and the linked pair of carbon atoms is a segment of a characterizing long aliphatic chain.

An important object of the invention is the provision of novel vinylacylated long chain aliphatic compounds having particular utility as intermediates in the preparation of useful resinous products by homopolymerization through the attached vinyl groups and/or by copolymerization with other vinyl materials.

Another object of the invention is the provision of novel vinylacylated glycerides and other long chain fatty acid esters having generally the same utility as set forth in the foregoing statement of invention object.

The new compounds may be prepared conveniently by heating a vinyl carboxylic acid with an epoxidized long chain aliphatic compound in the presence of a vinyl polymerization inhibitor. The predominant reaction is the opening of the epoxy ring by the carboxyl group with the formation of the corresponding vinylacyloxy-hydroxy derivatives. The derivatives may also be regarded as hydroxy long chain alkyl esters of the vinyl carboxylic acid. The reaction products are homogeneous materials, frequently viscous liquids at room temperature, consisting mainly of the foregoing type of ester derivative. They may contain small proportions of secondary reaction products and substantial proportions of unaltered reactants.

Preparation of the new compounds is typified by the reaction of one mol of acrylic acid with one mol of the 2-ethylhexyl ester of 9,10-epoxystearic acid according to the following equation:

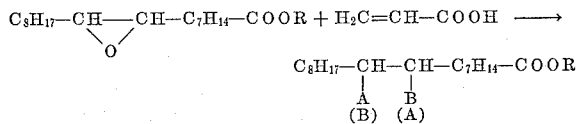

where A is hydroxyl, B is acryloxy, and R is 2-ethylhexyl. A mixture of the 2-ethylhexyl esters of 9-acryloxy-10-hydroxystearic acid and 9-hydroxy-10-acryloxystearic acid is obtained because the carbon-oxygen bonds in the oxirane ring are opened singly and randomly by the carboxyl group of the acrylic acid.

When one mol of acrylic acid is reacted with one mol of the 2-ethylhexyl ester of 9,10-12,13-diepoxystearic acid according to the present invention, the reaction product consists chiefly of a mixture of the several isomeric epoxy hydroxy acryloxy stearates with the several isomeric doubly hydroxylated and acryloxylated stearates.

The foregoing general method of preparation is convenient because of the abundance and variety of ethylenically unsaturated long chain aliphatic carboxylic acids in tall oil and in vegetable and animal oils. The unsaturated long chain acids, whether in the free state or as esters, may be easily epoxidized by known means. Also, the acids may be converted by known means into the corresponding unsaturated amides and alcohols. These two classes of compounds can then be epoxidized and reacted with vinyl carboxylic acids to yield the desired vinylacylated long chain aliphatic compounds.

The present invention is not restricted to the classes of vinylacyloxy hydroxy long chain aliphatic compounds mentioned above, namely, carboxylic acids, carboxylic esters, carboxylic amides, and alcohols. Additional classes of vinylacyloxy-hydroxy long chain aliphatic compounds contemplated by the present invention are hydrocarbons, ethers, amines, mercaptans, isocyanates, nitriles, halides, quaternary ammonium salts, and salts of carboxylic acids. The carboxylic amides may be N-substituted, the amines may be primary, secondary, or tertiary, and the carboxylic acid salts may be metal salts or nitrogen base salts.

Gnerally speaking, the new compounds of this invention may contain one or more functional groups provided those groups do not interfere substantially with the primary utility of the compounds, i.e., polymerization through the attached vinyl groups.

The following animal and vegetable oils are among the numerous naturally occurring unsaturated triglycerides which are suitable starting materials for the preparation of the new compounds embraced by the present invention: soybean, corn, cottonseed, hempseed, safflower, peanut, linseed, rice bran, olive, cod, herring, and menhaden. Artificial esters of the naturally occurring unsaturated long chain acids are also satisfactory starting materials. The glycerides, and esters generally, are stable and lead to only minor proportions of secondary products during epoxidation and subsequent vinylacylation.

The new compounds of the present invention may contain more than one long aliphatic chain and/or more than one vinylacyloxy group. An example containing multiple long chains and multiple vinylacyloxy groups is obtained by fully epoxidizing a triglyceride containing three unsaturated long chain acyl groups and then acylating the product with a slight excess of acrylic acid.

They may also contain epoxy groups, ethylenic unsaturation (—CH=CH—), and halogen substituents in the long aliphatic chains. The presence of the first two substituents in the new compounds, singly or together, is made conveniently possible by means of the foregoing general method of preparation. Unsaturation remains if the epoxidation is incomplete, and epoxy groups remain if the vinylacylation is incomplete. Both will occur in the final product if incomplete epoxidation is followed by incomplete acylation of the epoxy groups. Depending upon the end use of the vinylacyloxy-hydroxy long chain aliphatic compound, substantial contents of either or both of these two substituents in the compound may be desirable. Halogen, e.g., chlorine, may be readily introduced by addition to the residual ethylenic double bonds. It may be convenient at times to use this means to eliminate residual ethylenic unsaturation in the new compounds.

In accordance with the present invention, suitable parent or starting material esters are represented by the following general formula:

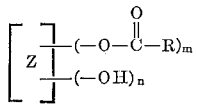

wherein Z is a radical selected from the group consisting of phenyl, benzyl, ortho-tolyl, meta-tolyl, para-tolyl, meta-phenylene, furfuryl, cyclohexyl, inosityl, glyceryl, pentaerythrityl, arabityl, sorbityl, alkylene having from 2 to 12 carbons, and alkyl having from 1 to 24 carbons, $m$ is an integer ranging from 1 to 6, $n$ is an integer ranging from 0 to 5, the sum of $m$ and $n$ is the number of hydroxyl groups in the original alcohol, R is an alkyl group of 1 to 24 carbons, and taken together Z and R provide at least one ethylenically unsaturated aliphatic chain having from 10 to 24 carbon atoms.

The alcohols from which the foregoing parent esters may be derived thus contain from 1 to 6 hydroxyl groups and from 1 to 24 carbon atoms. They may be saturated or ethylenically unsaturated. They may be open chain compounds such as n-butanol, glycerol, and sorbitol, or cyclic compounds such as furfuryl alcohol, cyclohexanol, and inositol. Among the suitable alcohols for this purpose are the monohydric alcohols ranging from methyl to lignoceryl, including the many possible isomers in which the hydroxyl groups may be primary, secondary or tertiary. Among the many suitable dihydric alcohols are ethylene glycol, methylene glycol, and the polyoxyalkylene glycols having 1 to 3 carbon atoms in each oxyalkylene group, i.e., the polymethylene glycols, the polyethylene glycols, and the polypropylene glycols. Additional suitable higher polyhydric alcohols are pentaerythritol, arabitol, trimethylolethane and trimethylolpropane.

Suitable parent esters may also be obtained from the unsaturated long chain acids and aromatic hydroxy compounds such as phenol, the cresols, and rescorinol.

Included by the present invention are vinylacylated esters wherein the parent ester consists of a polyhydric alcohol only partially acylated with a long chain carboxylic acid. Examples of this are the products obtained by carefully epoxidizing monoglycerides and diglycerides containing a suitable unsaturated long chain acyl group and then esterifying the epoxy compounds with the vinyl carboxylic acids. Also included by the invention are vinylacylated esters wherein the parent ester is derived from polyhydric alcohols, acylated in part by other acids. For example, the glyceryl hydroxy groups in the foregoing monoglycerides and diglycerides may be esterified with acetic acid.

The presence of groups in the epoxidized long chain aliphatic compound which are reactive with the epoxy group at elevated temperatures, such as hydroxyl, amino, carboxyl, and amido, may lead to side reactions during acylation of the epoxy compound with the vinyl carboxylic acids. Generally, however, the side reaction products are compatible with the main reaction products and with homopolymers and copolymers derived therefrom.

In accordance with the present invention, an essential feature of the characterizing vinylacyloxy groups in the new compounds is the presence of a polymerizable vinyl group. This feature is present in structures represented by the following general formula:

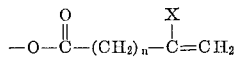

in which X is selected from the class consisting of hydrogen, halogen, cyano, —CH₂—COO (lower alkyl), phenyl, benzyl, and lower alkyl groups, and $n$ is an integer ranging from 0 to 2. Examples of vinyl acids which furnish the required vinylacyloxy radicals are acrylic acid, methacrylic acid, alpha chloroacrylic acid, alpha cyanoacrylic acid, alpha benzylacrylic acid, atropic acid, methyl acid itaconate, vinyl acetic acid, vinyl acrylic acid and allyl acetic acid.

The physical and chemical characteristics of the new compounds contemplated by this invention, and especially those of the polymers and resins derived therefrom, can be altered substantially by choice of the starting epoxidized compound, by choice of the vinyl carboxylic acid, and by the degree or extent of acylation with the vinyl carboxylic acid. Furthermore, by copolymerization of the vinylacylated monomer with a variety of vinyl monomers, such as methyl methacrylate, ethyl acrylate, butyl methacrylate, stearyl acrylate, acrylic acid, methacrylic acid, styrene, methylstyrene, allyl alcohol, vinyl acetate, vinyl stearate, acrylonitrile, butadiene, and the like, or unsaturated compounds such as maleic acid, crotonic acid, cinnamic acid, dipentene, myrcene, and the like, the resulting copolymers range from viscous liquids through soft gels to tough rubbery products and hard resins.

The new vinylacylated compounds may be polymerized through their vinyl groups with known peroxide catalysts to form homopolymers, or they may be polymerized with vinyl monomers and/or further polymerizable vinyl materials to produce copolymers. The new compounds containing epoxy groups may be cross-linked through these groups to form useful condensation products. The homopolymers, copolymers, and condensation products are useful broadly as protective coatings, textile and paper additives and sizing agents, laminating resins, potting resins, stabilizer-plasticizers, and adhesives. They are also useful in the manufacture of cast and extruded objects.

The novel compounds containing epoxy groups are also useful as stabilizer-plasticizers and as intermediates in the preparation of internally stabilized and plasticized resins. To function as a stabilizer-plasticizer for polyvinyl chloride, for example, the ester must possess an appreciable content of oxirane oxygen, be compatible with the resin and have a sufficiently low vapor pressure. Examples of esters meeting these requirements are those obtained by reacting a fully epoxidized vegetable oil, such as soybean oil, with less than one mol of acrylic acid per atom of oxirane oxygen. When such compounds are incorporated with polyvinyl chloride at the elevated temperatures normally required for this step, some homopolymerization usually occurs. The homopolymerization of the vinylacylated ester is a distinct advantage because it reduces the vapor pressure of the stabilizer-plasticizer and thus prolongs its retention in the resin.

The internally stabilized and plasticized resins may be obtained from the new compounds containing epoxy groups by homopolymerizing the latter, through their vinyl groups, or by copolymerizing them with other vinyl monomers. Such resinous products may be prepared either from the new compounds of medium molecular weight as, for example, those derived from vegetable oils, or from those of lower molecular weight such as the fully epoxidized n-butyl ester of linoleic acid.

Residual unreacted vinyl carboxylic acid may be present in the new products of this invention. If present during subsequent vinyl polymerization, it readily homopolymerizes and/or copolymerizes with any polymerizable vinyl material to form homogeneous products. If desired, however, the residual vinyl carboxylic acid may be removed by vacuum distillation, solvent extraction, or by contact with an acid-adsorbing resin.

It will be apparent from the foregoing description that the new vinylacylated long chain aliphatic compounds of the present invention may have one or more vinylacyloxy groups and one or more of the characteristic long chain alkyl groups. The invention contemplates (1) the separate molecular species of the defined vinylacylated long chain aliphatic compounds, (2) mixtures of such molecular species, and (3) the separate or mixed species together with compatible unreacted starting materials and/or compatible side reaction products thereof.

The following examples illustrate my invention and describe convenient methods of preparing new compounds which are specific embodiments of my invention.

Example 1

A mixture of 25.0 grams (0.10 equivalent of oxirane oxygen) of epoxidized soybean oil and 7.2 grams (0.10 equivalent of carboxyl) of acrylic acid (inhibited with 0.0072 gram of monomethyl ether of hydroquinone) was heated with mixing under reflux for one hour at 125° C. and then cooled to room temperature. The cooled product was a viscous liquid which contained 2.13% oxirane oxygen (42% of the original content) and 1.42 milliequivalents/gram of acid (46% of the original acrylic acid). After being mixed with 1% benzoin and exposed to sunlight for two hours, the product polymerized to a clear, pale yellow, fairly tough, pliable solid.

Example 2

A mixture of 25.0 grams (0.1 equivalent of oxirane oxygen) of epoxidized soybean oil and 21.6 grams (0.3 equivalent of carboxyl) of acrylic acid (inhibited with 0.0216 gram of monomethyl ether of hydroquinone) was heated with mixing under reflux for one hour at 125° C. and then cooled to room temperature. The cooled product, a viscous liquid, was transferred to a separatory funnel and diluted with ethyl ether. It was washed a number of times, first with aqueous 1% NaHPO$_4$, and then with aqueous 1% NaCl until free of acidity, and dried under vacuum by warming. The product was a highly-viscous oil which analyzed as follows:

Acid value (mg. KOH/g.) _____ 6.0
Saponification value (mg. KOH/g.) _____ 295
Oxirane oxygen (percent) _____ 0.20
Hydroxyl value (mg. KOH/g.) _____ 145

Infrared absorption spectrophotometry showed no evidence for the oxirane oxygen structure. The acrylate ester structure was very pronounced, but there was no absorption band for free acrylic acid. The most outstanding absoption was that due to the presence of hydroxyl groups. A small portion of the product was polymerized to a clear, tough, fairly hard solid by adding 1% benzoin and exposing it to sunlight for several hours. Another portion was heated at 60° C. for 12 hours with benzoyl peroxide as a catalyst. The polymer had an elastic modulus in torsion of 40,000 p.s.i. at 0° C. which dropped to 10,000 p.s.i. at 20° C. and 2,000 p.s.i. at 60° C. A third portion was copolymerized with an equal weight of styrene by heating at 60° C. for 12 hours using benzoyl peroxide as a catalyst. This clear, hard, slick-surfaced polymer had an elastic modulus in torsion of 222,000 p.s.i. at 40° C. which fell to 10,000 p.s.i. at 60° C.

Example 3

A mixture of 19.5 grams (0.05 equivalent of oxirane oxygen) of epoxidized soy fatty acid 2-ethylhexyl esters and 4.3 grams (0.05 equivalent of carboxyl) of methacrylic acid (inhibited with 0.0043 gram of hydroquinone) was heated slowly with stirring for about ten minutes under reflux to 168° C. and then cooled to room temperature. The cooled product was a yellow, fluid liquid containing 2.4% oxirane oxygen (70% of the original content). By adding 1% benzoin to a portion of the product and exposing it to sunlight, a soft, almost wax-like polymer was formed. By adding 20% methyl methacrylate to another portion of the product and polymerizing as before a much tougher, elastic solid was formed. The addition of 20% butyl methacrylate to a third portion of the product followed by polymerization gave a very clear, tough, rubber-like solid.

Example 4

Two hundred and fifty grams (1.0 equivalent of oxirane oxygen) of epoxidized soybean oil was heated to 125° C. To this was added 86 gams (1.0 equivalent of carboxyl) of methacrylic acid inhibited with 0.172 gram of hydroquinone. The mixture was heated at 125° C. for 0.75 hour, then at 150° C. for two hours and then cooled to room temperature. The viscous product analyzed as follows:

Acid value (mg. KOH/g.) _____ 73
Saponification value (mg. KOH/g.) _____ 291
Oxirane oxygen (percent) _____ 0.48
Hydroxyl value (mg. KOH/g.) _____ 145

By adding 1% benzoyl peroxide to the product and heating it at 60° C. for six hours a fairly hard and tough, slightly pliable, clear, pale yellow polymer was formed. It had an elastic modulus in torsion of 140,000 p.s.i. at 40° C. which decreased to 10,000 p.s.i. at 140° C. A 50:50 copolymer of the product with methyl methacrylate was formed under the above conditions. It had an elastic modulus in torsion of 300,000 p.s.i. at 40° C. which decreased to 10,000 p.s.i. at 90° C. A 50:50 copolymer of the product with styrene formed under the same conditions was a very hard, tough, clear, pale yellow solid.

Example 5

A mixture of 50 grams (0.2 equivalent of oxirane oxygen) of epoxized soybean oil and 28.8 grams (0.2 equivalent of carboxyl) of monomethyl itaconate was heated for 1.25 hours with stirring to 170° C. and then cooled to room temperature. The cooled product was a viscous liquid containing 0.05% oxirane oxygen (1% of the original content) and 0.96 milliequivalent/gram of acid (38% of the original content). After adding 1% benzoin to the product and exposing it to sunlight, the product polymerized to a clear, fairly hard, pliable solid. By adding 1% benzoyl peroxide to a part of the product and heating it at 65° C. for 4.5 hours, a much harder, less pliable, clear solid polymer was obtained.

Example 6

A slurry of 0.09 gram (0.0014 mole) of zinc dust in 244 grams (1.0 mole of oxirane oxygen) of epoxized soybean oil was prepared. Then 0.192 gram of monomethyl ether of hydroquinone (MEHQ) was dissolved in 129 grams (1.5 moles) of methacrylic acid (inhibited with 0.025% MEHQ) and added to the epoxidized soybean oil. The mixture was heated with agitation to 128–130° C. and maintained at this temperature for 1.5 hours. The following data were obtained on the cooled liquid product:

Free methacrylic acid, wt. percent _____ 20.0
Oxirane oxygen, wt. percent _____ 0.25
Saponification value, meq./g. _____ 6.00
Refractive index, $n_D^{45}$ _____ 1.4640
Density, $d_4^{35}$ _____ 1.035
Viscosity, poises @ 25° C. _____ 28.0

A portion of the product was cured to a clear, pale-yellow, tough pliable polymer by incorporating 1% benzoyl peroxide and heating at 60° C. for 16 hours. By copolymerizing a portion under similar conditions with 33.3% styrene a tougher, harder, more rigid product was formed.

Example 7

A slurry of 0.045 gram (0.0007 mole) of zinc dust in 182 grams (0.50 mole of oxirane oxygen) of epoxidized tall oil fatty acid isooctyl esters was prepared. Then 0.132 gram of MEHQ was dissolved in 64 grams (0.75 mole) of methacrylic acid (inhibited with 0.025% MEHQ) and added to the epoxidized soybean oil. The mixture was heated with stirring at 128°–130° C. for 2.5 hours. The following data were obtained on the cooled product:

Free methacrylic acid, meq./g. _____ 1.88
Oxirane oxygen, meq./g. _____ 0.47
Saponification value, meq./g. _____ 4.69

To 10.0 grams of the clear, yellow liquid product was added 3.3 grams of styrene and 0.1 gram of benzoyl peroxide. By heating at 100° C. for 2 hours a very tough, flexible, clear thermoset polymer was formed.

Example 8

A mixture of 25.00 grams (53 millimoles of oxirane oxygen) of epoxidized soybean oil fatty acid monoglyceride, 6.88 grams (80 millimoles) of methacrylic acid (inhibited with 0.025% MEHQ), 0.01 gram of p-methoxy-phenol was heated with stirring and air sparging at 125° C. for 2.5 hours. The cooled product analyzed 0.71 meq./g. oxirane oxygen and 1.55 meq./g. acid (indicating 55% methacrylation). By adding 1% benzoyl peroxide to a portion of the product and heating at 115° C. for one hour, a clear, tough, pliable polymer was formed. Similarly, by curing a mixture of the product and 33 wt. percent styrene at 115° C. for one hour with 1% benzoyl peroxide, a clear, tough, pliable copolymer was formed.

Example 9

A mixture of 20.00 grams (54 millimoles of oxirane oxygen) of epoxidized soybean oil fatty alcohol, 6.95 grams (81 millimoles) of methacrylic acid (inhibited with 0.025% MEHQ), 0.63 gram (0.5 millimole) of zinc dust, and 0.027 gram (0.1% wt. percent total mixture) of p-methoxyphenol was heated with stirring and air sparging at 125° C. for 1.5 hours. Analyses of the cooled product indicated 52% methacrylation of the fatty alcohol.

Free methacrylic acid, meq./g. _____ 1.51
Saponification value, meq./g. _____ 1.08
Oxirane oxygen, meq./g. _____ 0.79

One percent benzoyl peroxide was added to a portion of the liquid product which was then heated at 75° C. for five hours. A fairly tough, clear, pale yellow, pliable polymer was formed.

Example 10

A solution of 0.344 gram (0.06 wt. percent total mixture) of MEHQ in 86 grams (1.0 mole) of methacrylic acid was added to a mixture of 0.141 gram (0.0022 mole) of zinc dust in 488 grams (2.0 moles of oxirane oxygen) of epoxidized soybean oil. The reactants were heated with stirring and air sparging at 125° C. for 1.5 hours. After cooling to room temperature the product analyzed as follows:

Free methacrylic acid, wt. percent _____ 5.80
Oxirane oxygen, wt. percent _____ 2.77
Saponification value, meq./g. _____ 4.19

A small portion of this clear, viscous liquid product was heated with 1% benzoyl peroxide at 100° C. for 2.5 hours to form a clear, very flexible, fairly soft thermoset polymer. The polymer had an elastic modulus in torsion of 10,000 p.s.i. at −3° C.

I claim:

1. A polymerizable vinylated long-chain fatty compound having an aliphatic chain of from 10 to 24 carbon atoms and on said aliphatic chain vicinal acryloxy and hydroxy substituents, said acryloxy substituent having attached to the alpha carbon atom thereof a group selected from the class consisting of hydrogen, cyano, halogen, phenyl, benzyl, lower alkyl and —CH₂—COO (lower alkyl), said long chain fatty compound having no vinylation except that in said acryloxy groups, any epoxy groups being only in said aliphatic chain.

2. A polymerizable vinylated long chain fatty compound according to claim 1 wherein the acryloxy substituent conforms to the structure

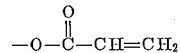

3. A polymerizable vinylated long chain fatty compound according to claim 1 wherein the acryloxy substituent conforms to the structure

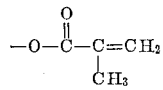

4. A polymerizable vinylated ester of the structure

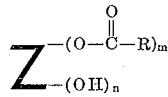

wherein Z is a radical of a hydroxyl compound; $m$ is a number ranging from 1 to 6; $n$ is a number ranging from 0 to 5; the sum of $m$ and $n$ ranges from 1 to 6, the number of hydroxyl groups in the original hydroxyl compound; each R is independently a monovalent aliphatic chain of from 1 to 24 carbon atoms, at least one R being a monovalent aliphatic chain of from 10 to 24 carbon atoms and containing vicinal acryloxy and hydroxy substituents; and each of said acryloxy substituents has attached to the alpha carbon atom thereof a group selected from the class consisting of hydrogen, cyano, halogen, phenyl, benzyl, lower alkyl and —CH₂—COO (lower alkyl), said ester having no vinylation except that in said acryloxy group, any epoxy groups being only in said aliphatic chain.

5. A polymerizable vinylated long chain fatty acid ester having an esterified aliphatic fatty acid chain of from 10 to 24 carbon atoms wherein said aliphatic fatty acid chain contains vicinal acryloxy and hydroxy substituents, and each of said acryloxy substituents has attached to the alpha carbon atom thereof a group selected from the class consisting of hydrogen, cyano, halogen, phenyl, benzyl, lower alkyl and —CH₂COO (lower alkyl), said long chain fatty compound having no vinylation except that in said acryloxy groups, any epoxy groups being only in said aliphatic chain.

6. A polymerizable vinylated ester according to claim 4 wherein the acryloxy substituent conforms to the structure

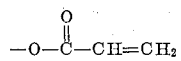

7. A polymerizable vinylated ester according to claim 4 wherein the acryloxy substituent conforms to the structure

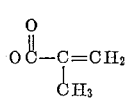

8. A polymerizable vinylated glyceride oil wherein at least one of the glyceride fatty acid chains has vicinal acryloxy and hydroxy substituents, and each said acryloxy substituent has attached to the alpha carbon atom thereof a group selected from the class consisting of hydrogen, cyano, halogen, phenyl, benzyl, lower alkyl and —CH₂—COO (lower alkyl), said glyceride oil having no vinylation except that in said acryloxy groups.

9. A polymerizable glyceride oil according to claim 8 wherein the glyceride oil is soybean oil.

10. A polymerizable glyceride oil according to claim 8 wherein the acryloxy substituent conforms to the structure

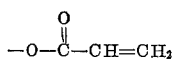

11. A polymerizable glyceride oil according to claim 8 wherein the acryloxy substituent conforms to the structure

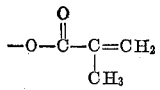

References Cited by the Examiner

UNITED STATES PATENTS

| | | | |
|---|---|---|---|
| 2,129,694 | 9/1938 | Izard | 260—89.5 X |
| 2,129,722 | 9/1938 | Woodhouse | 260—89.5 X |
| 2,160,532 | 5/1939 | Barrett et al. | 260—89.5 X |
| 2,458,888 | 1/1949 | Reheberg et al. | 260—89.5 |
| 2,575,440 | 11/1951 | Bradley | 260—18 |
| 2,728,781 | 12/1955 | Shohal et al. | |
| 2,824,851 | 2/1958 | Hall | 260—47 |
| 2,975,148 | 3/1961 | Skiff | 260—23 |
| 2,999,827 | 9/1961 | McGary et al. | 260—23 |
| 3,010,925 | 11/1961 | Lynn | 260—23 |
| 3,023,178 | 2/1962 | Greenlee et al. | 260—18 X |

LEON J. BERCOVITZ, *Primary Examiner.*

M. STERMAN, *Examiner.*